(12) United States Patent
Takahashi

(10) Patent No.: US 8,134,732 B2
(45) Date of Patent: Mar. 13, 2012

(54) COMMUNICATION APPARATUS

(75) Inventor: Jun Takahashi, Fujisawa (JP)

(73) Assignee: Ricoh Company, Ltd., Tokyo (JP)

( * ) Notice: Subject to any disclaimer, the term of this patent is extended or adjusted under 35 U.S.C. 154(b) by 818 days.

(21) Appl. No.: 12/230,986

(22) Filed: Sep. 9, 2008

(65) Prior Publication Data

US 2009/0073489 A1  Mar. 19, 2009

(30) Foreign Application Priority Data

Sep. 13, 2007 (JP) ................................. 2007-237467

(51) Int. Cl.
*G06F 3/12* (2006.01)
*H04N 1/00* (2006.01)

(52) U.S. Cl. ........................................ 358/1.15; 358/440

(58) Field of Classification Search .................. 358/438, 358/439, 468, 440, 1.15, 1.16, 405; 379/100.01, 379/100.06
See application file for complete search history.

(56) References Cited

U.S. PATENT DOCUMENTS

| 6,704,398 B2 * | 3/2004 | Tsuchiyama .............. 379/93.23 |
| 2006/0159444 A1 * | 7/2006 | Mokunaka .................... 396/299 |
| 2008/0152197 A1 * | 6/2008 | Kawada ....................... 382/115 |

FOREIGN PATENT DOCUMENTS

| JP | 07-182372 | 7/1995 |
| JP | 2001-285454 | 10/2001 |
| JP | 3379640 | 12/2002 |
| JP | 2003-110686 | 4/2003 |
| JP | 2005-159874 | 6/2005 |
| JP | 2005-252744 | 9/2005 |

OTHER PUBLICATIONS

Abstract of JP 2000-358094 published Dec. 26, 2000.

* cited by examiner

*Primary Examiner* — Jerome Grant, II
(74) *Attorney, Agent, or Firm* — Harness, Dickey & Pierce, P.L.C.

(57) ABSTRACT

A communication apparatus for transmitting a document to a recipient address specified out of multiple address-book addresses displayed based on address-book data stored in an address book includes a controller configured to control a display order of the address-book addresses displayed in accordance with one transmission-address specifying mode selected out of a plurality of transmission-address specifying modes.

7 Claims, 15 Drawing Sheets

| REGISTRATION NUMBER | COUNTER (BEFORE MAX) | COUNTER (AFTER MAX) | COUNTER (AFTER LIMIT CONTROL) |
|---|---|---|---|
| 001 | 999 | 1000 | 500 |
| 002 | 600 | 600 | 100 |
| 003 | 500 | 500 (REFERENCE VALUE) | 0 |

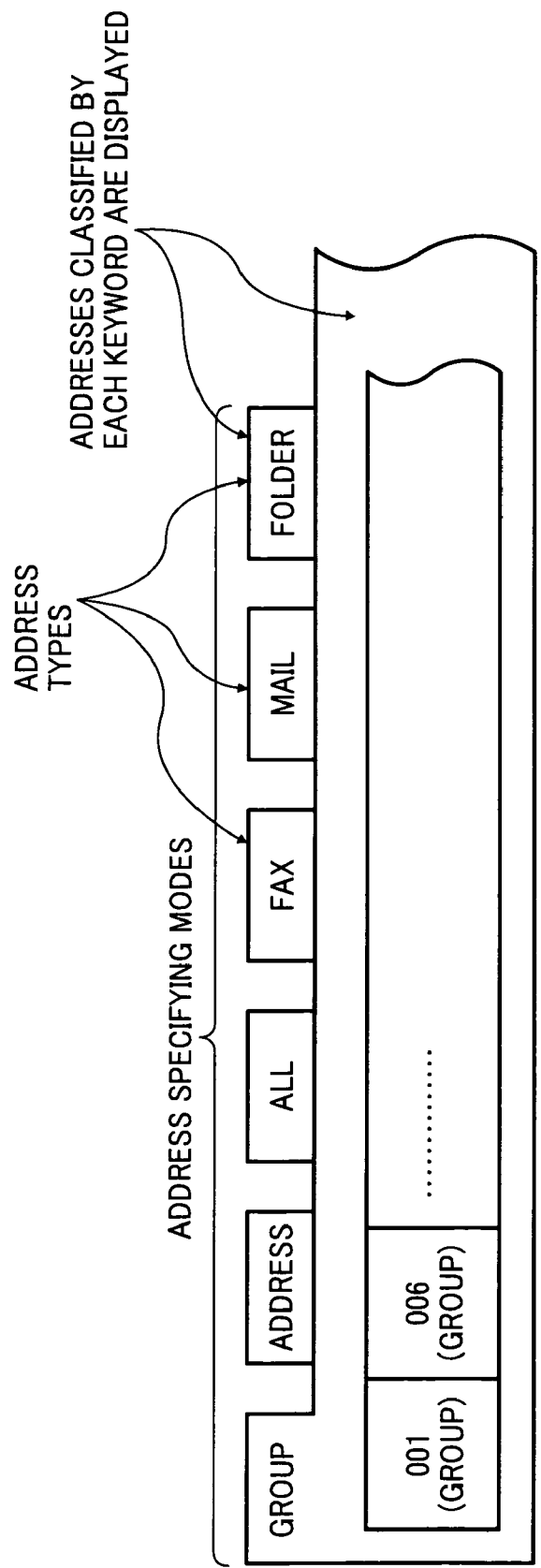

| REGISTRATION NUMBER | 001 | 002 | 003 | 004 |
|---|---|---|---|---|
| ADDRESS CLASSIFICATION | GROUP ADDRESS | SINGLE ADDRESS | SINGLE ADDRESS | SINGLE ADDRESS |
| GROUP MEMBER (REG. NO.) | 002<br>003<br>004 | — | — | — |
| ADDRESS-BOOK OWNER | MEMBER A | MEMBER A | MEMBER A | MEMBER A |
| TOTAL USE COUNTEER | 100 | 200 | 250 | 100 |
| FAX-ADDRESS USE COUNTER | — | 100 | 100 | 0 |
| MAIL-ADDRESS USE COUNTER | — | 50 | 100 | 50 |
| FOLDER-ADDRESS USE COUNTER | — | 50 | 50 | 50 |
| PARTICULAR ADDRESS | NON-TARGET | NON-TARGET | NON-TARGET | NON-TARGET |
| FAX ADDRESS | — | 222-2222 | 333-3333 | — |
| MAIL ADDRESS | — | m2@abc | m3@abc | m4@abc |
| FOLDER ADDRESS | — | 222.2222. ... | 333.3333. ... | 444. ... |

FIG. 3B

| 005 | 006 | 007 | .... |
|---|---|---|---|
| SINGLE ADDRESS | GROUP ADDRESS | SINGLE ADDRESS | .... |
| — | 005<br>007 | — | .... |
| MEMBER B | MEMBER B | MEMBER B | .... |
| 100 | 50 | 150 | .... |
| 50 | — | 50 | .... |
| 50 | — | 0 | .... |
| 0 | — | 100 | .... |
| NON-TARGET | NON-TARGET | TARGET | .... |
| 555-5555 | — | 777-7777 | .... |
| m5@abc | — | — | .... |
| — | — | 777.... | .... |

FIG. 4

| ADDRESS (REGISTRATION NUMBER) | GROUP (REGISTRATION NUMBER) | RESULT | DOCUMENT NUMBER |
|---|---|---|---|
| 002 | 001 | ERROR | 0123 |
| 003 | 001 | ERROR | 0123 |
| 004 | 001 | OK | 0123 |
| 005 | — | OK | 0124 |
| 007 | — | OK | 0125 |

Rows for documents 0123 — REG. NO. 001 SPECIFIED
Row for document 0124 — REG. NO. 005 SPECIFIED
Row for document 0125 — REG. NO. 007 SPECIFIED

FIG. 15

| REGISTRATION NUMBER | COUNTER (BEFORE MAX) | COUNTER (AFTER MAX) | COUNTER (AFTER LIMIT CONTROL) |
|---|---|---|---|
| 001 | 999 | 1000 | 500 |
| 002 | 600 | 600 | 100 |
| 003 | 500 | 500 (REFERENCE VALUE) | 0 |

COMMUNICATION APPARATUS

CROSS-REFERENCE TO RELATED APPLICATIONS

The present patent application claims priority pursuant to 35 U.S.C. §119 from Japanese Patent Application No. 2007-237467, filed on Sep. 13, 2007 in the Japan Patent Office, the entire contents of which are hereby incorporated herein by reference.

BACKGROUND OF THE INVENTION

1. Field of the Invention

The present invention relates to a communication apparatus such as a facsimile machine, for example.

2. Description of the Background

Recently, communication apparatuses have been provided with various functions, thereby increasing both the amount of registration information storable therein and the complexity of operation thereof.

For example, in a conventional type of communication apparatus, when setting a recipient address to transmit a document, a user must locate the recipient address among a great number of addresses registered in an address book, which may impose a relatively heavy load on the user.

To reduce such load, one conventional method allocates a priority order and a counter to each address registered in an address book of a cellular phone. When the cellular phone performs data transmission or reception to an address, the counter allocated to that address is incremented. Such address-book addresses are displayed in descending order of the number of transmissions and receptions, thereby enhancing operability when a user searches the address book for an address in a subsequent data transmission.

In another conventional method, the way to display addresses registered in an address book is changed depending on an application software used by a user, thereby enhancing operability when a user selects an address for data transmission.

In still another conventional method, a table including registered numbers is stored in a random access memory (RAM) and referred to when transmission or reception is performed. A counter indicating the use frequency of each phone number is incremented when the phone number is used. In such configuration, when a user searches for a phone number, the above-described table is referred to and the registered numbers in the table are displayed in descending order of their use frequencies indicated by the counters.

Further, in other conventional methods, the number of transmission times is counted by each day of the week or each time zone, and phone numbers are preferentially displayed in descending order of transmission frequency, thereby reducing a time required for a user to operate a phone number.

Meanwhile, communication apparatuses may be capable of registering a single address (hereinafter, simply referred to as an "address") and a group address, including a collection of individual addresses, in an address book.

However, when a conventional method as described above is applied to such communication apparatus, it may be difficult to judge whether or not group addresses or other address-book addresses specific to the communication apparatus are displayed in proper priority order.

Consequently, there is a need for a communication apparatus capable of enhancing operability and convenience when a user searches for an address in an address book, thereby preventing mistransmission.

SUMMARY OF THE INVENTION

Exemplary embodiments of the present invention provide a communication apparatus capable of enhancing operability and convenience when a user searches for an address in an address book, thereby preventing mistransmission.

In one exemplary embodiment of the present invention, a communication apparatus for transmitting a document to a particular recipient address specified out of multiple address-book addresses displayed based on address-book data stored in an address book includes a controller configured to control a display order of the address-book addresses displayed in accordance with one transmission-address specifying mode selected out of a plurality of transmission-address specifying modes.

BRIEF DESCRIPTION OF THE DRAWINGS

A more complete appreciation of the disclosure and many of the attendant advantages thereof will be readily acquired as the same becomes better understood by reference to the following detailed description when considered in connection with the accompanying drawings, wherein:

FIG. 2 illustrates an example of an address book display;

FIGS. 3A and 3B illustrate examples of data structures of an address book stored in the communication apparatus illustrated in FIG. 1;

FIG. 4 illustrates an example of a data structure of a transmission history stored in the communication apparatus illustrated in FIG. 1;

FIG. 15 illustrates an example of counter values of respective addresses before and after a limit control is performed at a maximum value of an address counter.

Figure 1:
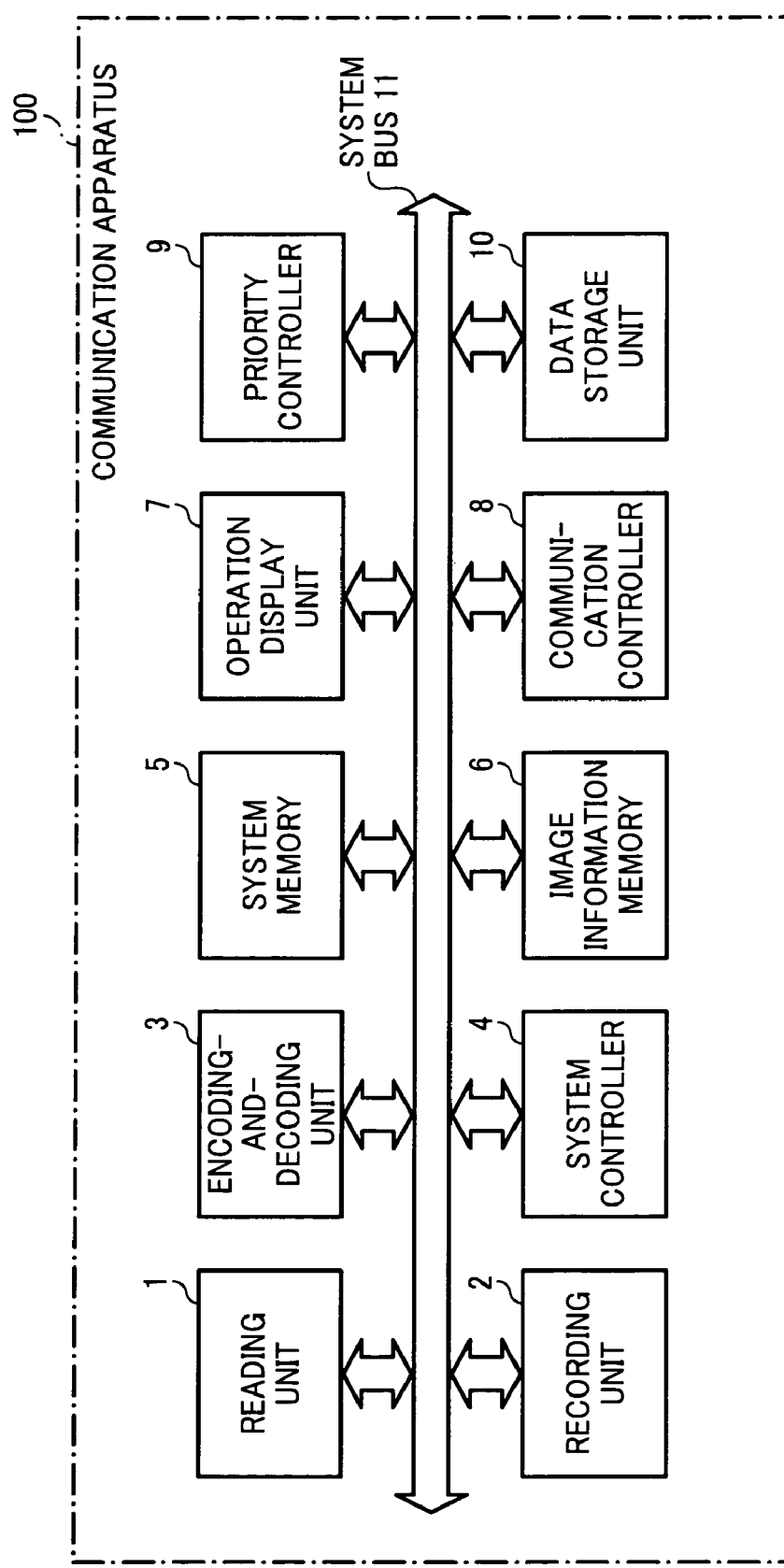
FIG. 1 is a block diagram illustrating a structure of a communication apparatus according to a first exemplary embodiment of the present invention.

The accompanying drawings are intended to depict exemplary embodiments of the present disclosure and should not be interpreted to limit the scope thereof. The accompanying drawings are not to be considered as drawn to scale unless explicitly noted.

DETAILED DESCRIPTION OF EXEMPLARY EMBODIMENTS

In describing exemplary embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner and achieve similar results.

Below, exemplary embodiments of the present disclosure are described with reference to the attached drawings.

FIG. 1 is a block diagram illustrating a structure of a communication apparatus according to a first exemplary embodiment of the present invention.

As illustrated in FIG. 1, the communication apparatus 100 has a reading unit 1 to read an original document, a recording unit 2 to record received image information, reports, and other information, an encoding-and-decoding unit 3 to encode and decode such image information, a system controller 4 to manage authentication processes and control the whole system, a system memory 5 serving as a working area used in system control, an image information memory 6 to store image information as needed, an operation display unit 7 in which keys, LED, LCD, and the like are provided to allow a user to perform input operations, a communication controller 8 to control various types of transmission and reception, a priority controller 9 to update counters of addresses registered in an address book, sort in a preferential order, and determine maximum and minimum values of the address counters when transmission is performed, a data storage unit 10 storing address-book data and other data, and a system bus 11 through which the above-described components communicate data and information.

FIG. 2 illustrates an example of the address book displayed based on such address-book data stored in the communication apparatus 1. Criteria for classifying address-book addresses are switched in accordance with a transmission-address specifying mode selected out of a plurality of transmission-address specifying modes, thereby allowing an address-book address(es) to be displayed in a form suitable for the selected transmission-address specifying mode.

Next, a description is given of an operation of the communication apparatus 100 having the above-described configuration according to the first exemplary embodiment with reference to FIGS. 3 to 7.

Figure 5:
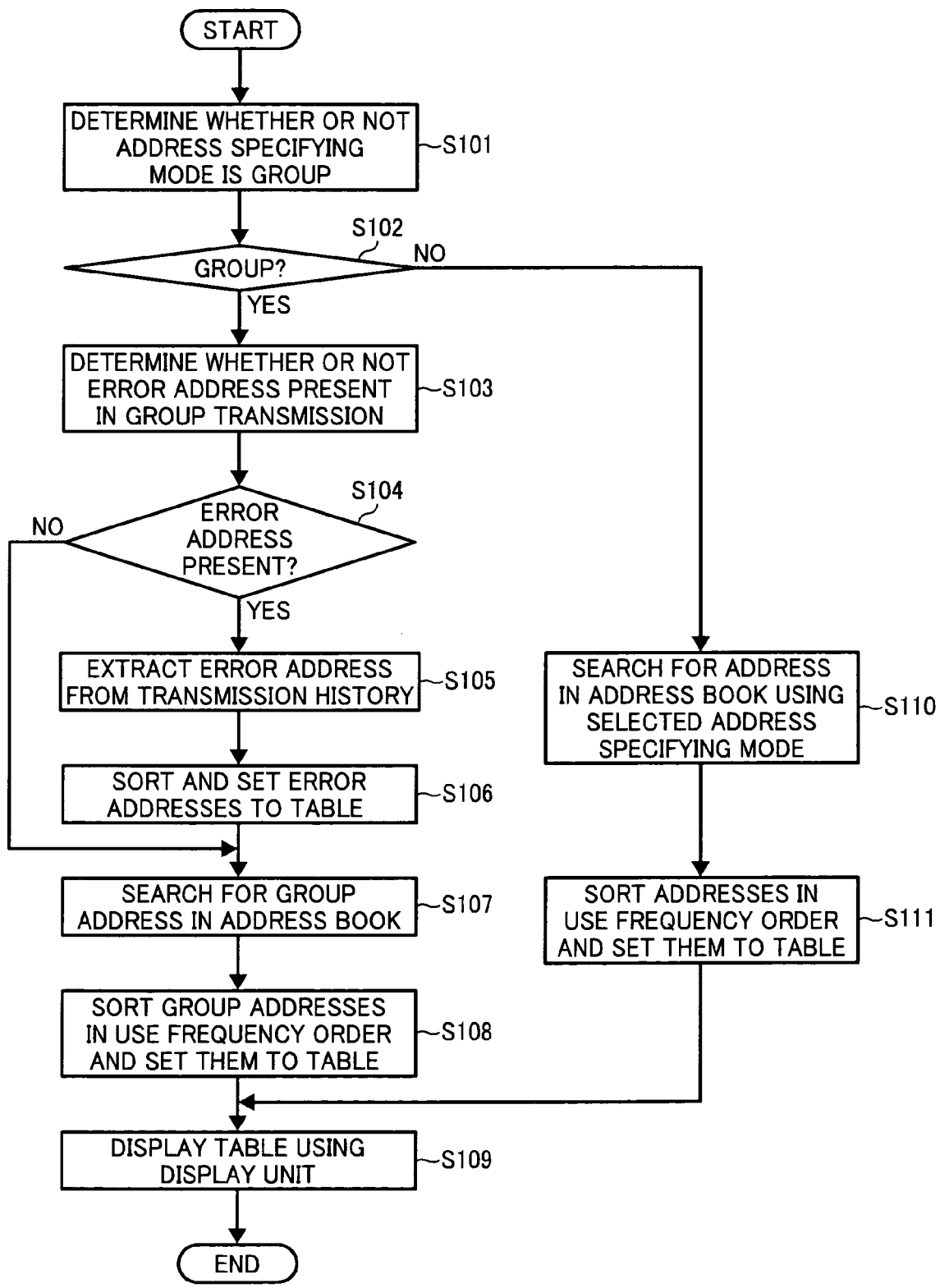
FIG. 5 is a flow chart illustrating a process flow from when a transmission-address specifying mode is determined (or set to a group-address specifying mode) to when preferential display is performed.

FIGS. 3A and 3B are examples of data structures of the address book stored in the communication apparatus 100. FIG. 4 is an example of a data structure of a transmission history in the communication apparatus 100. FIG. 5 is a flow chart illustrating a process flow from when the transmission-address specifying mode is determined (or is set to a group specification method) to when preferential display is performed.

In FIGS. 3A and 3B, address-book data includes a collection of various items previously set and stored for each registration number.

In FIG. 5, at S101 it is determined whether or not the transmission-address specifying mode is a group-specifying mode.

If the transmission-address specifying mode is not a group-address specifying mode ("NO" at S102), at S110 a relevant address is searched for in the address book using the selected transmission-address specifying mode.

At S111, addresses found by the search at S110 are sorted in order of use frequency and are set to a display table.

At S109, a display unit (e.g., the operation display unit 7) displays the display table and the process ends.

At S102, if the transmission-address specifying mode is a group-address specifying mode ("YES" at S102), at S103 it is determined whether or not there is an address having been subjected to an error in a group transmission based on the transmission history as illustrated in FIG. 4.

If such error address is present ("YES" at S104), at S105 such error address is extracted from the transmission history and at S106 is set to the display table.

At S107, a group address to be displayed following such error address is searched in the address book.

Alternatively, at S104, if such error address for the group transmission is not present ("NO" at S104), at S107 the address book is searched for a group address to be displayed. In the search, the address-book data illustrated in FIG. 3 is searched for an address whose address type is classified as the group address.

Next, at S108, group addresses found by the search at S107 are sorted in order of use frequency and set into the display table.

At S109, a display unit (e.g., the operation display unit 7) displays the display table and the process ends.

Figure 6:
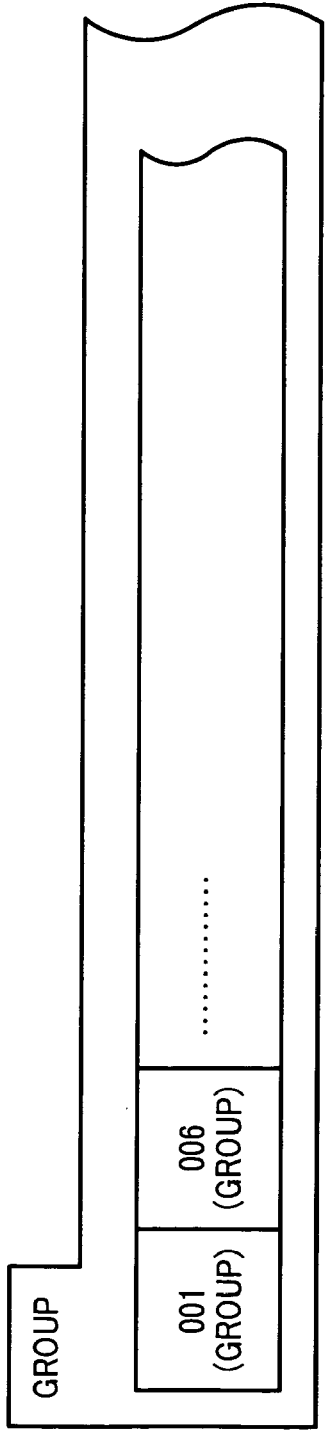
FIG. 6 illustrates a display example of group addresses in an operation display unit.

FIG. 6 is a display example of group addresses in the operation display unit 7. The group addresses are preferentially displayed in order of use frequency thereof. Such configuration can enhance operability and convenience when a user searches for an address-book address, thereby preventing mistransmission.

Figure 7:
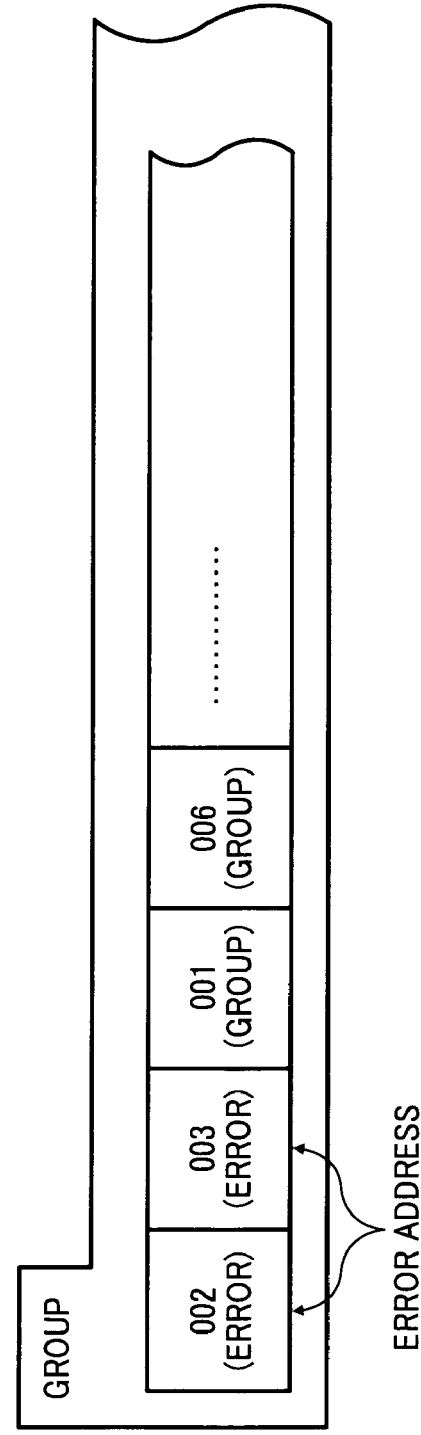
FIG. 7 illustrates a display example of group addresses in the operation display unit when error addresses are present with respect to group transmission.

FIG. 7 is a display example of addresses in the operation display unit 7 when error addresses for group transmission are present. Preferentially displaying such group addresses in order of use frequency thereof can enhance operability and convenience when a user searches for an address-book address, thereby preventing mistransmission.

Figure 8:
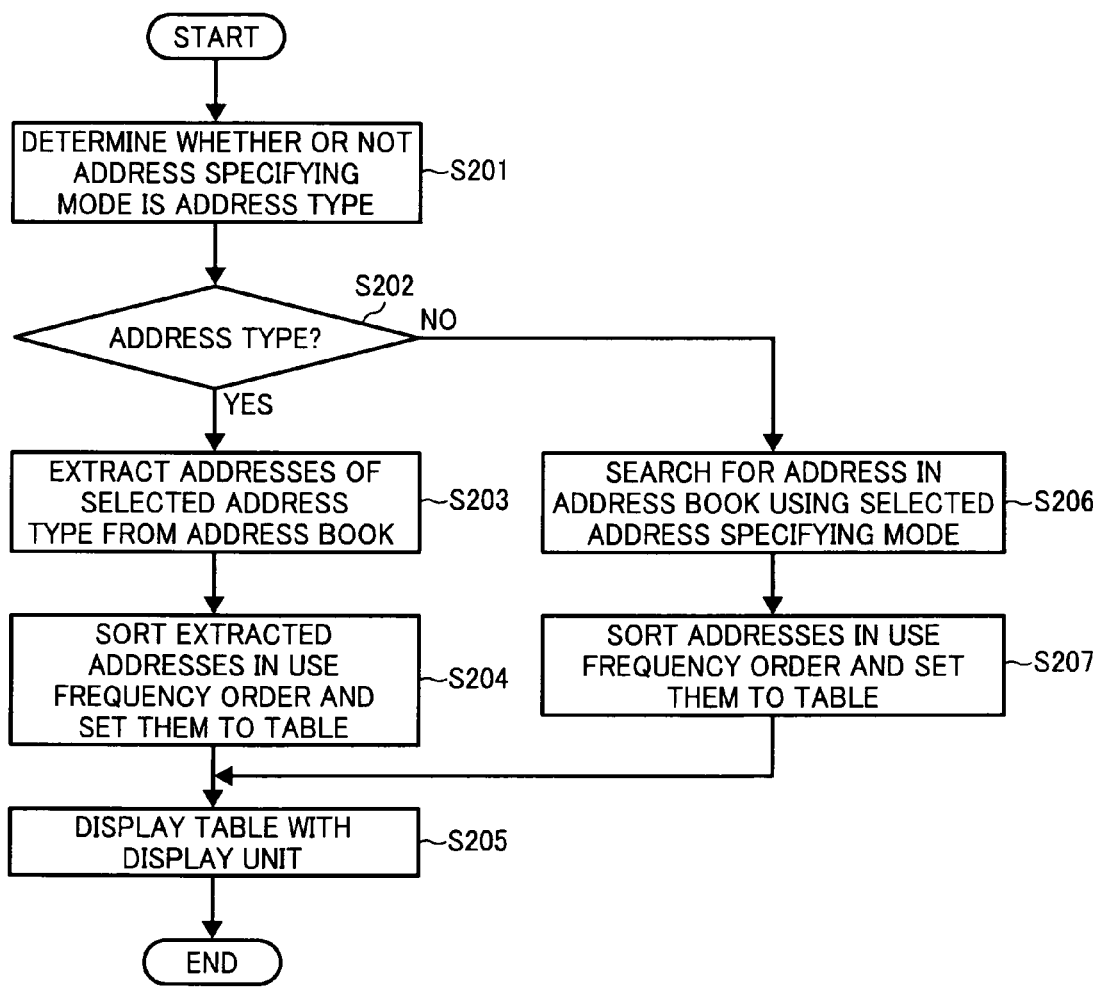
FIG. 8 is a flow chart illustrating a process flow from when the transmission-address specifying mode is determined (or set to an address-type specifying mode) to when preferential display is performed.
Figure 9:
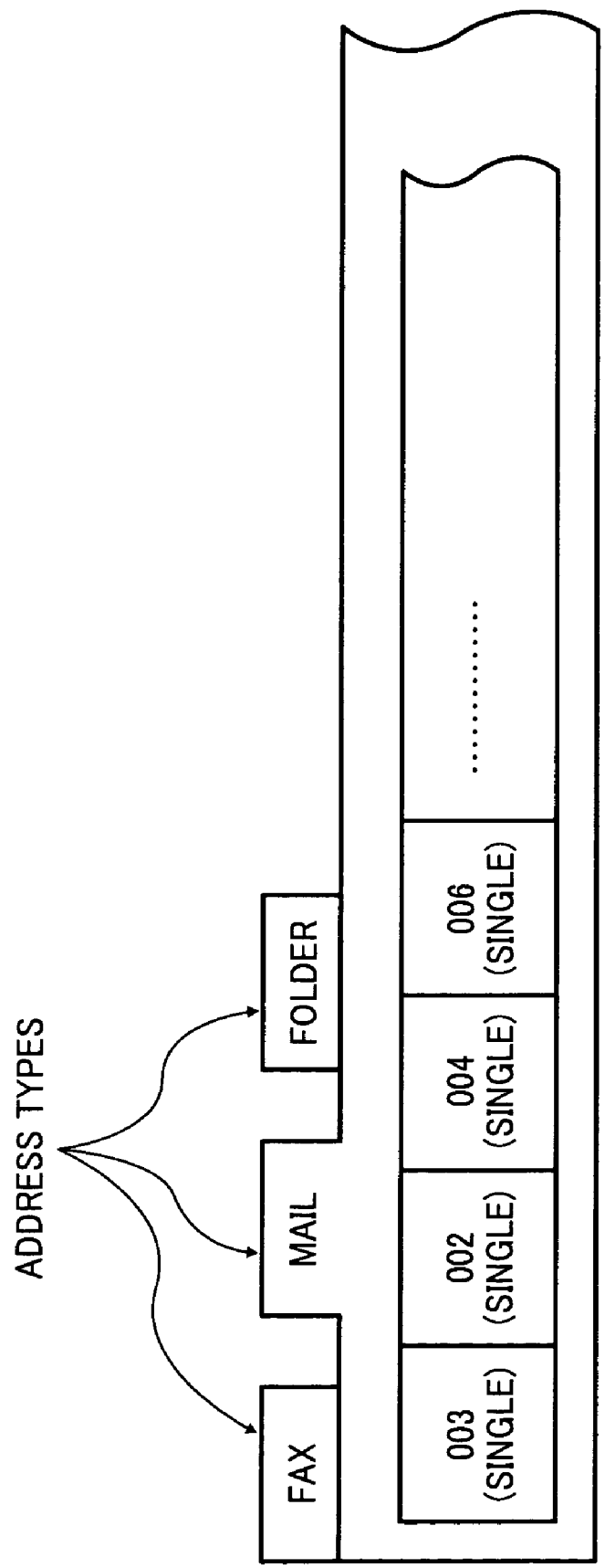
FIG. 9 illustrates a display example of addresses in the operation display unit when "mail" is selected as an address type.

Next, a description is given of an operation of a communication device 100 according to a second exemplary embodiment with reference to FIGS. 3, 8, and 9.

As described above, FIG. 3 is an example of the data structure of an address book stored in the communication apparatus 100. FIG. 8 is a flow chart illustrating a process flow from when the transmission-address specifying mode is determined (or set to an address-type specification mode) to when preferential display is performed.

In FIG. 8, at S201 it is determined whether or not the transmission-address specifying mode is an address-type specifying mode.

If the transmission-address specifying mode is not an address-type specifying mode ("NO" at S202), at S206 the address book is searched for a relevant address using a specified transmission-address specifying mode.

At S207, addresses found by the search at S206 are sorted in order of use frequency and are set to a display table.

At S205, a display unit (e.g., the operation display unit 7) displays the display table and the process ends.

If the transmission-address specifying mode is an address-type specifying mode ("YES" at S202), at S203 an address of a selected address type is extracted from among addresses of the address-book.

At S204, addresses extracted at S203 are sorted in order of use frequency and are set to a display table.

At S205, a display unit (e.g., the operation display unit 7) displays the display table and the process ends.

FIG. 9 is a display example of addresses in the operation display unit 7 when "mail" is selected as the address type. As illustrated in FIG. 9, addresses classified as mail addresses are displayed in order of use frequency from the address-book data illustrated in FIG. 3. Such configuration can enhance operability and convenience when a user searches for an address-book address, thereby preventing mistransmission.

Figure 10:
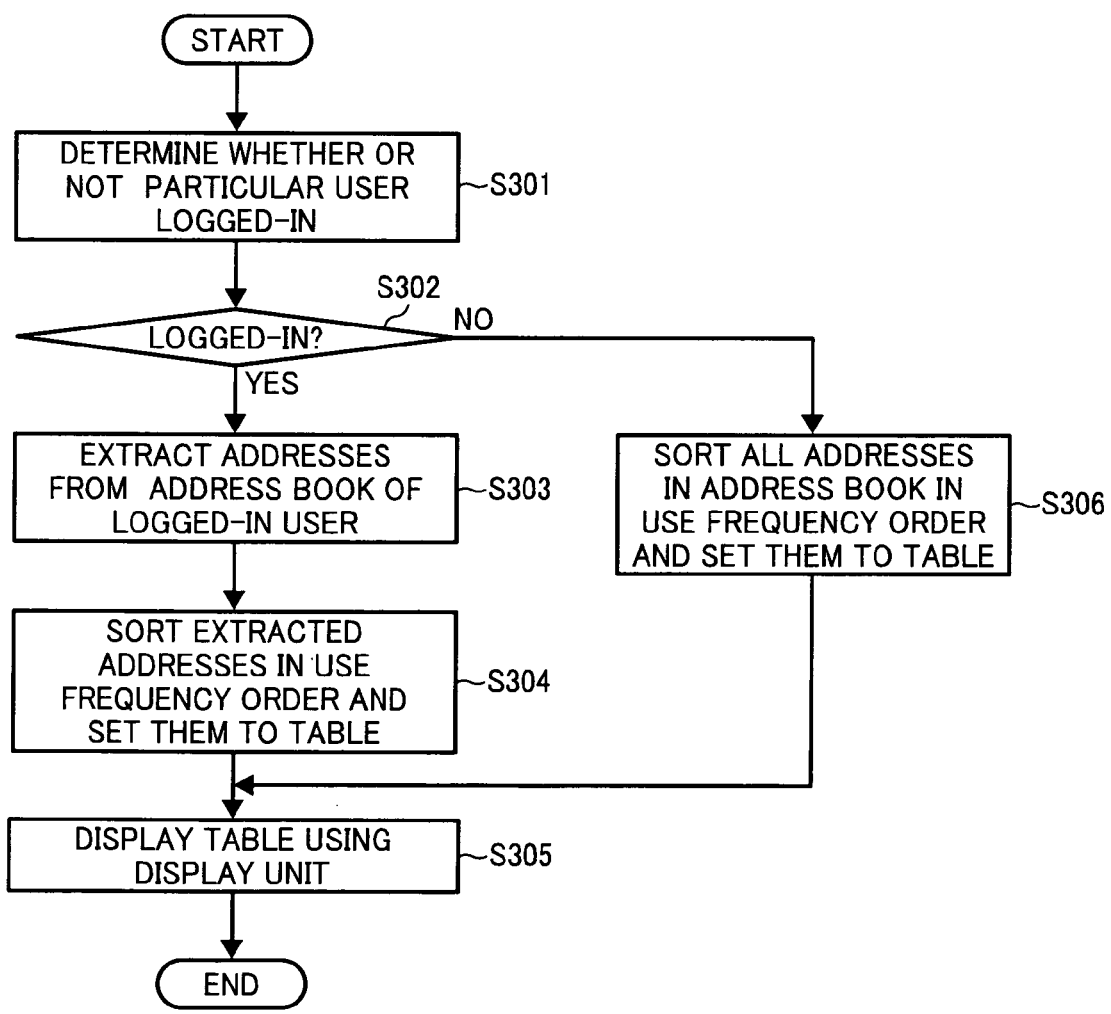
FIG. 10 is a flow chart illustrating a process flow of preferentially displaying address-book addresses of a logged-in user.
Figure 11:
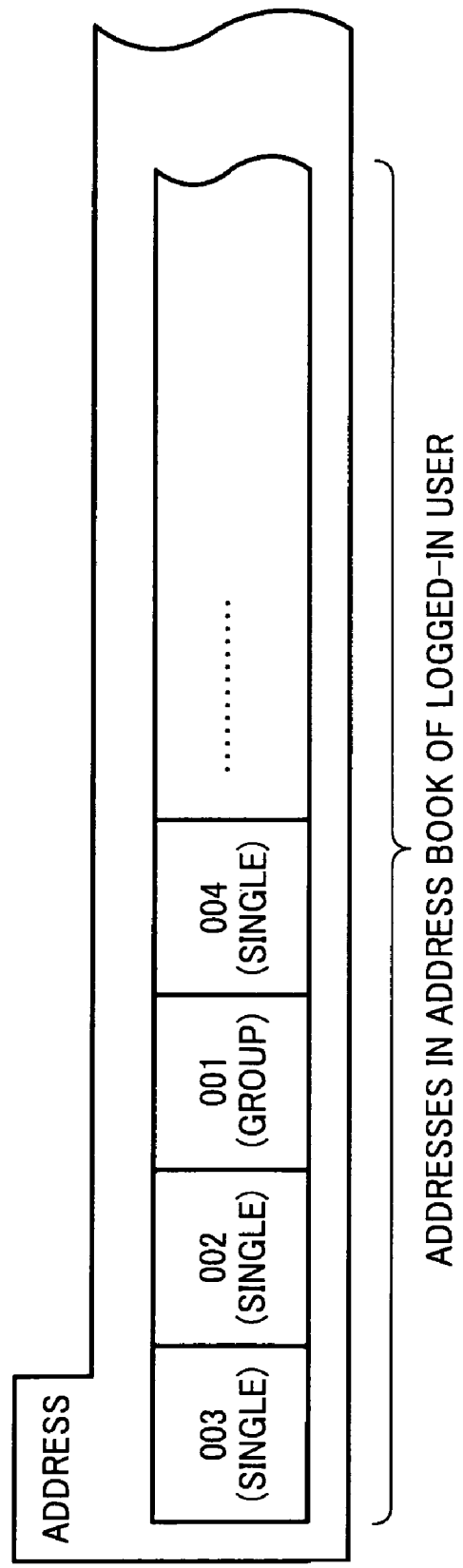
FIG. 11 illustrates a display example of address-book addresses of a logged-in user.

Next, a description is given of an operation of a communication apparatus 100 according to a third exemplary embodiment with reference to FIGS. 3, 10, and 11.

As in the above-described exemplary embodiments, FIG. 3 illustrates an example of the data structure of an address book stored in the communication apparatus 100 according to the third exemplary embodiment. FIG. 10 is a flow chart illustrating a process flow of preferentially displaying address-book addresses of a logged-in user.

In FIG. 10, at S301 it is determined whether or not a user is logged in.

If the user is not logged in ("NO" at S302), at S306 all addresses in the address book are sorted in order of use frequency and are set to a display table.

At S305, a display unit (e.g., the operation display unit 7) displays the display table and the process ends.

If the user is logged in ("YES" at S302), at S303 addresses of the user are extracted from the address-book data illustrated in FIG. 3.

At S304, the addresses extracted at S303 are sorted in order of use frequency are set to a display table.

At S305, a display unit (e.g., the operation-display unit 7) displays the display table and the process ends.

FIG. 11 is a display example of address-book addresses of a logged-in user. Addresses in which the logged-in user is registered as the owner of the address book are displayed in order of use frequency from the address-book data illustrated in FIG. 3. Such configuration can enhance operability and convenience when a user searches for an address-book address, thereby preventing mistransmission.

Figure 12:
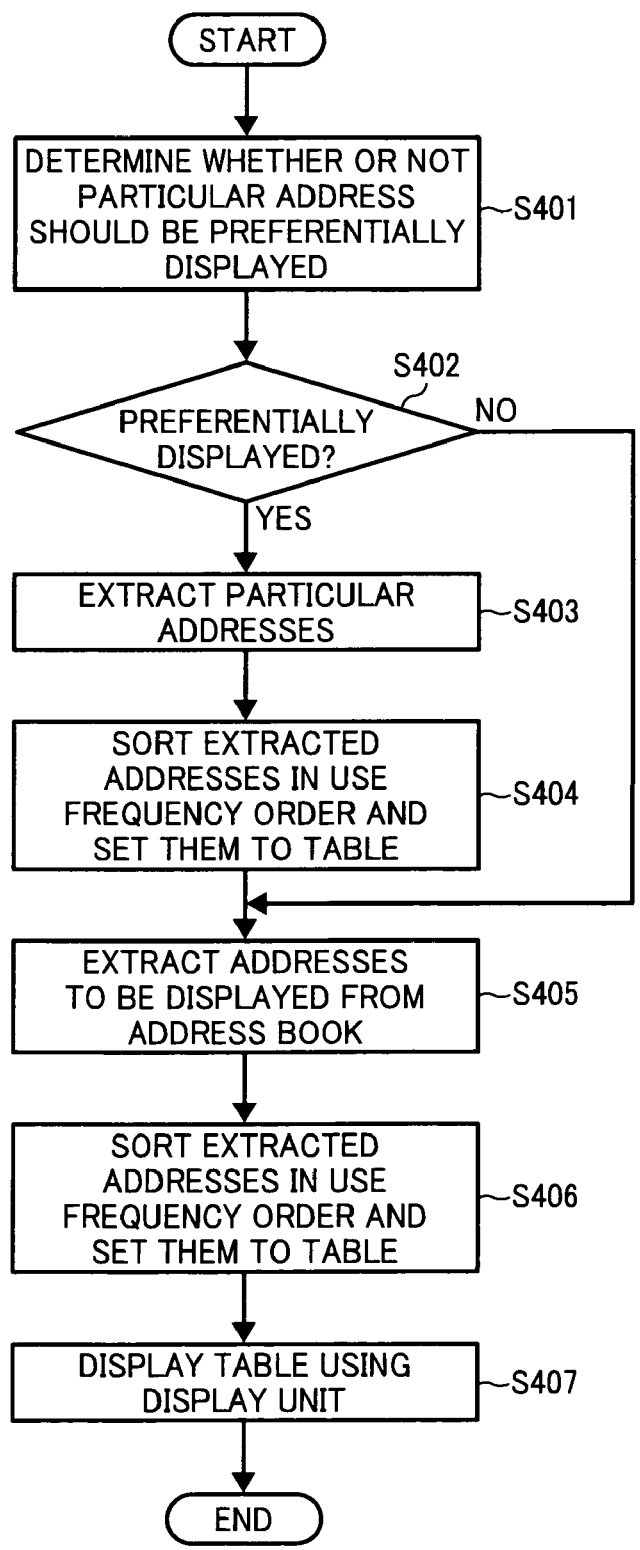
FIG. 12 is a flow chart illustrating a process flow of preferentially displaying particular addresses.
Figure 13:
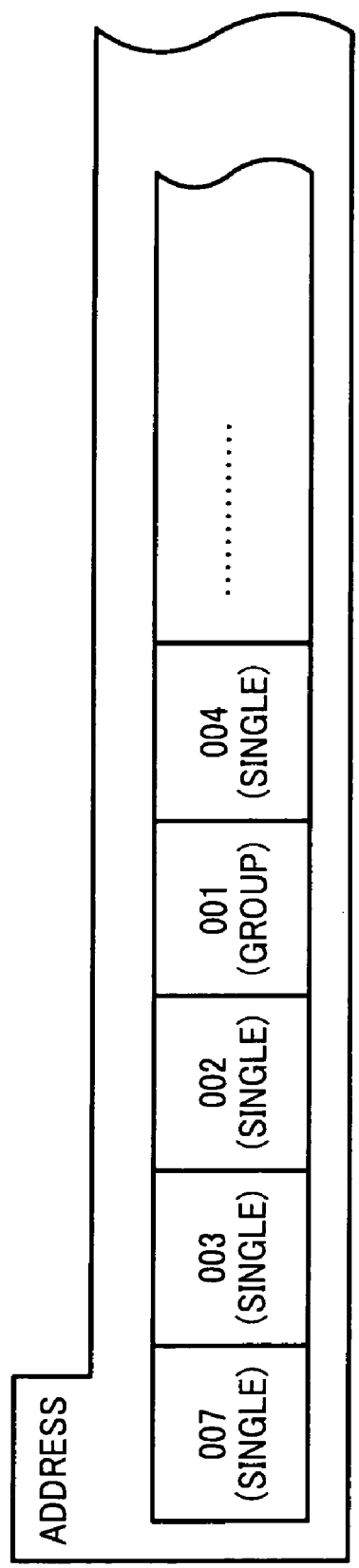
FIG. 13 illustrates an example in which particular addresses are preferentially displayed.

Next, a description is given of an operation of a communication apparatus 100 according to a fourth exemplary embodiment with reference to FIGS. 3, 12, and 13.

As in the above-described exemplary embodiments, FIG. 3 illustrates an example of the data structure of an address book stored in the communication apparatus 100 according to the fourth exemplary embodiment. FIG. 12 is a flow chart illustrating a process flow for preferentially displaying particular addresses previously registered in the communication apparatus 100.

In FIG. 12, at S401 it is determined whether or not such particular addresses previously registered in the communication apparatus 100 should be preferentially displayed.

If such particular addresses need not be preferentially displayed ("NO" at S402), at S405 addresses to be displayed are extracted from the address book.

Alternatively, if such previously-registered addresses should be preferentially displayed ("YES" at S402), at S403 such particular addresses are extracted from the address-book data illustrated in FIG. 3.

At S404, the addresses extracted at S403 are sorted in order of use frequency and are set to a display table.

At S405, addresses to be displayed are extracted from the address book.

At S406, the addresses extracted at S405 are sorted in order of use frequency and are set to a display table.

At S407, a display unit (e.g., the operation-display unit 7) displays the display table and the process ends.

FIG. 13 illustrates an example in which particular addresses are preferentially displayed. In FIG. 13, addresses classified as "particular address" are preferentially displayed from the address-book data illustrated in FIG. 3. Such particular addresses may be an address of a logged-in user. Thus, preferentially displaying such particular addresses can enhance operability and convenience when a user searches an address-book address, thereby preventing mistransmission.

Figure 14:
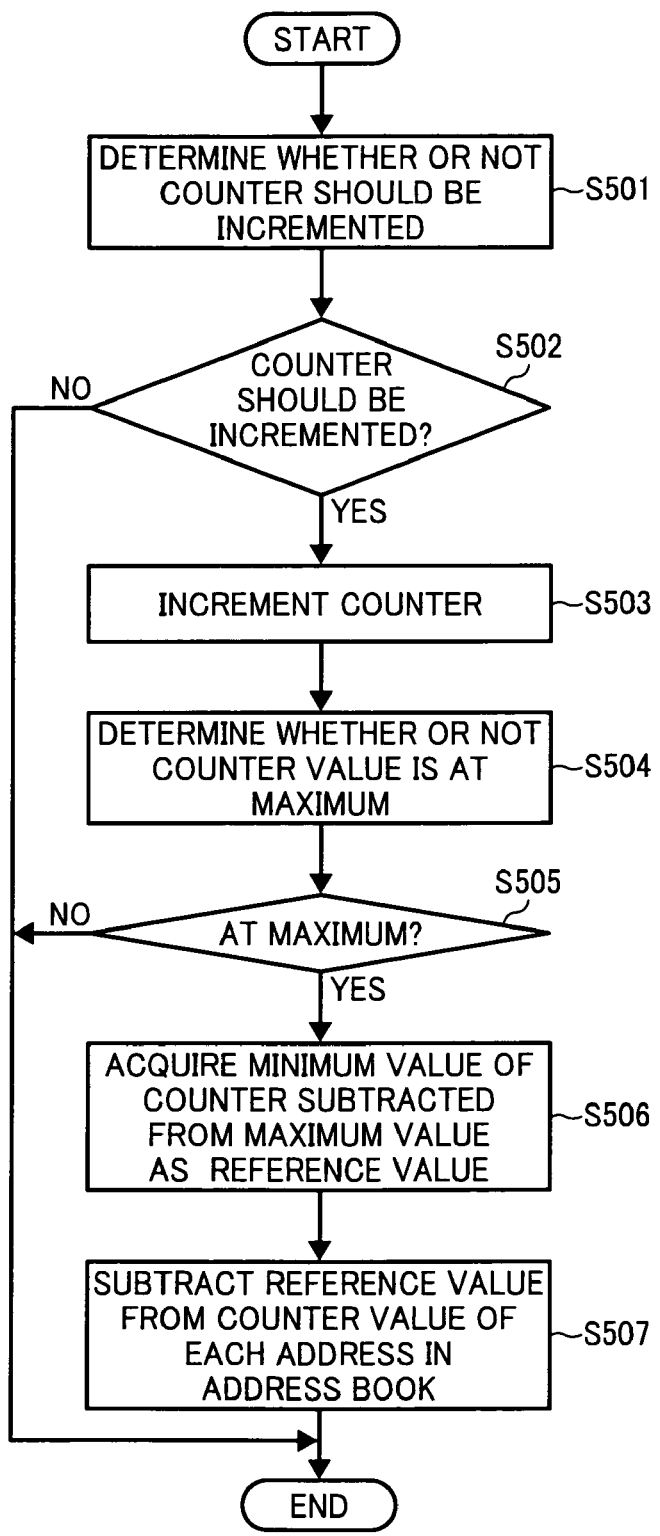
FIG. 14 is a flow chart illustrating a process flow of performing a limit control when an address counter reaches a maximum value.

Next, a description is given of an operation of a communication device 100 according to a fifth exemplary embodiment with reference to FIGS. 3, 14, and 15.

As in the above-described exemplary embodiments, FIG. 3 illustrates an example of the data structure of an address book stored in the communication apparatus 100 according to the fifth exemplary embodiment. FIG. 14 is a flow chart illustrating a process flow for performing a limit control when an address counter reaches a maximum value.

In FIG. 14, when transmission is performed with an address in the address book, at S501 it is determined whether or not the address counter should be incremented at that timing.

If the address counter need not be incremented ("NO" at S502), the process ends.

If the address counter should be incremented ("YES" at S502), at S503 the counter is incremented.

At S504, it is determined whether or not the address-counter has reached a maximum value thereof.

If the address counter has not reached the maximum value ("NO" at S505), the process ends.

If the address counter has reached the maximum value ("YES" at S505), at S506 a minimum value to be subtracted from the maximum value is searched for and acquired as a reference value.

At S507, the reference value thus acquired is subtracted from respective counter values of all addresses in the address book, and the process ends.

Although in the above description the minimum value of the address counter is subtracted from the respective counter values of all the addresses in the address book, such subtracted value may be any given setting value or a fixed value. It should be noted that the above-described configuration in which the minimum value of the counter address is subtracted has an advantage in that the number of such subtractions can be minimized.

FIG. 15 illustrates an example of counter values of respective addresses before and after a limit control is performed when an address counter reaches a maximum value. FIG. 15 indicates that ordinality of use frequency can be maintained even after the limit control is executed. Such maintenance of ordinality can enhance operability and convenience when a user searches for an address-book address, thereby preventing mistransmission.

Exemplary embodiments being thus described, it should be apparent to one skilled in the art after reading this disclosure that the examples and embodiments may be varied in many ways. Such variations are not to be regarded as a departure from the spirit and scope of the present invention, and such modifications are not excluded from the scope of the following claims.

What is claimed is:

1. A communication apparatus for transmitting a document to a recipient address specified out of multiple address-book addresses displayed based on address-book data stored in an address book, the communication apparatus comprising:
   a controller configured to control a display order of the address-book addresses displayed in accordance with one transmission-address specifying mode selected out of a plurality of transmission-address specifying modes;

a plurality of counters configured to count a value indicating frequency of use of each of the address-book addresses, the value being stored in the address-book data; and a limit controller configured to perform a subtraction control on the value of each of the counters so that the count value may not excess a limit at which an ordinality of the frequency of use for the respective address-book addresses is maintained.

2. The communication apparatus according to claim 1, further comprising a display unit to preferentially display a group address from the address-book addresses based on the address-book data when the selected transmission-address specifying mode is a group address specifying mode.

3. The communication apparatus according to claim 2, wherein, when a transmission error occurs in transmitting a document to the group address, the display unit preferentially displays the group address as an error address.

4. The communication apparatus according to claim 1, wherein the controller controls a priority order of the address-book addresses displayed for each address type when the address-book addresses are displayed based on the address-book data stored in the address book.

5. The communication apparatus according to claim 1, wherein the controller controls a display order of the address-book addresses displayed for each logged-in user when the address-book addresses are displayed based on the address-book data stored in the address book.

6. The communication apparatus according to claim 4, further comprising a specifying unit to specify a particular address-book address to be preferentially displayed regardless of the priority order of the address-book addresses.

7. The communication apparatus according to claim 1, wherein the limit controller performs the subtraction control by uniformly subtracting a current minimum value of the values of the counters from each of the values of the counters.

* * * * *